United States Patent
Jia et al.

(10) Patent No.: US 11,055,535 B2
(45) Date of Patent: Jul. 6, 2021

(54) METHOD AND DEVICE FOR VIDEO CLASSIFICATION

(71) Applicant: BOE TECHNOLOGY GROUP CO., LTD., Beijing (CN)

(72) Inventors: Honghong Jia, Beijing (CN); Jibo Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 41 days.

(21) Appl. No.: 16/542,209

(22) Filed: Aug. 15, 2019

(65) Prior Publication Data
US 2020/0210708 A1     Jul. 2, 2020

(30) Foreign Application Priority Data

Jan. 2, 2019   (CN) .......................... 201910002746.9

(51) Int. Cl.
  *G06K 9/00*  (2006.01)
  *G06K 9/62*  (2006.01)
  *G06T 7/269* (2017.01)

(52) U.S. Cl.
  CPC ..... *G06K 9/00718* (2013.01); *G06K 9/00744* (2013.01); *G06K 9/6256* (2013.01);
  (Continued)

(58) Field of Classification Search
  CPC .......... G06K 9/00718; G06K 9/00744; G06K 9/6256; G06K 9/6262; G06N 3/0454;
  (Continued)

(56) References Cited

U.S. PATENT DOCUMENTS 8,290,253 B1    10/2012  Wang et al.
10,289,912 B1 *  5/2019  Vijayanarasimhan .................... G06K 9/00718
(Continued)

FOREIGN PATENT DOCUMENTS

CN   106599789     4/2017
CN   106599789 A  * 4/2017 ............... G06K 9/00
(Continued)

OTHER PUBLICATIONS

1st Office Action dated Jun. 5, 2020 for Chinese Patent Application No. 201910002746.9.
(Continued)

*Primary Examiner* — Bobbak Safaipour
(74) *Attorney, Agent, or Firm* — Thomas | Horstemeyer, LLP (57) ABSTRACT

A method for video classification includes: extracting an original image and an optical flow image corresponding to a to-be-classified video from the to-be-classified video; inputting the original image to a space-domain convolutional neural network model to obtain a space-domain classification result corresponding to the to-be-classified video; inputting the optical flow image to a time-domain convolutional neural network model to obtain a time-domain classification result corresponding to the to-be-categorized video, wherein the time-domain convolutional neural network model and the space-domain convolutional neural network model are convolutional neural network models of different network architectures; and merging the space-domain classification result and the time-domain classification result to obtain a classification result corresponding to the to-be-classified video.

19 Claims, 2 Drawing Sheets

(52) U.S. Cl.
CPC ............ *G06K 9/6262* (2013.01); *G06T 7/269* (2017.01); *G06T 2207/10016* (2013.01); *G06T 2207/20081* (2013.01); *G06T 2207/20084* (2013.01)

(58) Field of Classification Search
CPC ............ G06N 3/08; G06T 2207/10016; G06T 2207/20081; G06T 2207/20084; G06T 7/269
See application file for complete search history.

(56) References Cited

U.S. PATENT DOCUMENTS

| | | | |
|---|---|---|---|
| 2017/0132496 A1* | 5/2017 | Shoaib | G06K 9/66 |
| 2017/0185872 A1* | 6/2017 | Chakraborty | G06K 9/66 |
| 2018/0247126 A1* | 8/2018 | Li | G06K 9/6215 |
| 2020/0134425 A1* | 4/2020 | Chen | G06N 3/084 |
| 2020/0160087 A1* | 5/2020 | Redmon | G06K 9/20 |
| 2020/0327382 A1* | 10/2020 | Otto | G06K 9/6273 |

FOREIGN PATENT DOCUMENTS

| | | |
|---|---|---|
| CN | 107330362 | 11/2017 |
| CN | 108764084 | 11/2018 |

OTHER PUBLICATIONS

Qinghui, Li; et al. (2018) "Double-Stream Convolutional Networks with Sequential Optical Flow Image for Action Recognition" Academy of Operational Support, Rocket Force Engineering University vol. 38, No. 6 p. 1-7.

\* cited by examiner

METHOD AND DEVICE FOR VIDEO CLASSIFICATION

CROSS-REFERENCE TO RELATED APPLICATIONS

The present application claims priority to Chinese Patent Application No. 201910002746.9 filed Jan. 2, 2019, the entire contents of which are incorporated herein by reference.

TECHNICAL FIELD

The present disclosure relates to the field of video classification technologies and, more particularly, relates to a method and a device for video classification.

BACKGROUND

With the continuous development of Internet technology, various video files appear over the Internet, such as movie video files, TV series video files, etc. Therefore, how to analyze and manage huge numbers of video files has become an important issue to be solved. During the process of analyzing and managing video files, how to accurately classify video files is critical. In video classification technology, a dual-stream convolutional neural network model consisting of a space-domain convolutional neural network model and a time-domain convolutional neural network model is a representative network model in which, after an original image and an optical flow image corresponding to a video file are provided to the space-domain convolutional neural network model and the time-domain convolutional neural network model respectively, the dual-stream convolutional neural network model can effectively recognize the motion of the object in the video file, thereby accurately outputting the category corresponding to the video file.

At present, in order to facilitate the construction of the dual-stream convolutional neural network model, a space-domain convolutional neural network model and a time-domain convolutional neural network model with the same network architecture are usually used to form a dual-stream convolutional neural network model. However, since the original image and the optical flow image each have different characteristics, the space-domain convolutional neural network model and the time-domain convolutional neural network model having the same network architecture are used to perform motion recognition on the original image and the optical flow image corresponding to the video file. This will affect the accuracy of motion recognition of objects in video files to a certain extent, which will reduce the accuracy of classifying video files.

SUMMARY

In view of this, the present disclosure provides a method and a device for video classification, the main object of which is to improve the accuracy of classifying video files.

In order to solve the above problems, the present disclosure mainly provides the following technical solutions.

In one aspect, the present disclosure provides a method for video classification, including:
  extracting an original image and an optical flow image corresponding to a to-be-classified video from the to-be-classified video;
  inputting the original image to a space-domain convolutional neural network model to obtain a space-domain classification result corresponding to the to-be-classified video;
  inputting the optical flow image to a time-domain convolutional neural network model to obtain a time-domain classification result corresponding to the to-be-categorized video, wherein the time-domain convolutional neural network model and the space-domain convolutional neural network model are convolutional neural network models of different network architectures; and
  merging the space-domain classification result and the time-domain classification result to obtain a classification result corresponding to the to-be-classified video.

Optionally, before extracting an original image and an optical flow image corresponding to the to-be-classified video from the to-be-classified video, the method further includes:
  acquiring a plurality of training videos and a classification label corresponding to each training video from a motion recognition data set and/or a gesture recognition data set;
  training a first convolutional neural network model according to the plurality of training videos and the classification label corresponding to each training video to obtain a space-domain convolutional neural network model; and
  training a second convolutional neural network model according to the plurality of training videos and the classification label corresponding to each training video to obtain a time-domain convolutional neural network model, wherein the second convolutional neural network model and the first convolutional neural network model are convolutional neural network models of different network architectures.

Optionally, training a first convolutional neural network model according to the plurality of training videos and the classification label corresponding to each training video to obtain a space-domain convolutional neural network model includes:
  extracting, from the plurality of the training videos, an original image corresponding to each of the training videos;
  setting the original images corresponding to the plurality of training videos as a training set of the first convolutional neural network model; and optimizing and adjusting parameters of the first convolutional neural network model according to a mapping relationship between an original image and a classification label corresponding to each of the training videos; and
  determining, when the first convolutional neural network model accurately outputs a classification label corresponding to each of the training videos, the first convolutional neural network model as the space-domain convolutional neural network model.

Optionally, training a second convolutional neural network model according to the plurality of training videos and the classification label corresponding to each training video to obtain a time-domain convolutional neural network model includes:
  extracting, from the plurality of the training videos, an optical flow image corresponding to each of the training videos;
  setting the optical flow images corresponding to the plurality of training videos as a training set of the second convolutional neural network model; optimizing and adjusting parameters of the second convolutional neural network model according to a mapping relationship between the optical flow image and the classification label corresponding to each of the training videos; and determining, when the second convolutional neural network model accurately outputs a classification label corresponding to each of the training videos, the second convolutional neural network model as the time-domain convolutional neural network model.

Optionally, merging the space-domain classification result and the time-domain classification result to obtain a classification result corresponding to the to-be-classified video includes:

calculating a weighted sum of the space-domain classification result and the time-domain classification result to obtain a classification result corresponding to the to-be-classified video, according to a first weight value corresponding to the space-domain classification result and a second weight value corresponding to the time-domain classification result.

Optionally, the space-domain classification result includes a space-domain score corresponding to each preset classification category, and the time-domain classification result includes a time-domain score corresponding to each of the preset classification categories; and calculating a weighted sum of the space-domain classification result and the time-domain classification result to obtain a classification result corresponding to the to-be-classified video, according to a first weight value corresponding to the space-domain classification result and a second weight value corresponding to the time-domain classification result includes:

calculating a weighted sum of a space-domain score and a time-domain score corresponding to each preset classification category according to the first weight value and the second weight value to obtain a total score corresponding to each preset classification category; and determining a preset classification category corresponding to the highest total score of the plurality of total scores as the classification result corresponding to the to-be-classified video.

Optionally, the first convolutional neural network model is a ResNeXt network model, and the second convolutional neural network model is an Inception-v3 network model.

In order to achieve the above object, according to another aspect of the present disclosure, there is provided an electronic device, including: a memory, a processor, and a program stored on the memory and executable on the processor, and when the processor executes the program, the method for video classification described above is implemented.

In order to achieve the above object, according to another aspect of the present disclosure, there is provided a computer readable storage medium having stored thereon a computer program, the program is executed to implement the method for video classification described above.

In another aspect, the present disclosure also provides a device for video classification, including:

an extracting unit configured to extract an original image and an optical flow image corresponding to a to-be-classified video from the to-be-classified video;

a first input unit configured to input the original image extracted by the extracting unit to a space-domain convolutional neural network model to obtain a space-domain classification result corresponding to the to-be-classified video;

a second input unit configured to input the optical flow image extracted by the extracting unit to a time-domain convolutional neural network model to obtain a time-domain classification result corresponding to the to-be-categorized video, wherein the time-domain convolutional neural network model and the space-domain convolutional neural network model are convolutional neural network models of different network architectures; and a merging unit configured to merge the space-domain classification result and the time-domain classification result to obtain a classification result corresponding to the to-be-classified video.

Optionally, the device further includes:

an acquiring unit configured to acquire a plurality of training videos and a classification label corresponding to each training video from a motion recognition data set and/or a gesture recognition data set before the extracting unit extracts an original image and an optical flow image corresponding to the to-be-classified video from the to-be-classified video;

a first training unit configured to train a first convolutional neural network model according to the plurality of training videos and the classification label corresponding to each training video acquired by the acquiring unit, to obtain a space-domain convolutional neural network model; and a second training unit configured to train a second convolutional neural network model according to the plurality of training videos and the classification label corresponding to each training video acquired by the acquiring unit, to obtain a time-domain convolutional neural network model, wherein the second convolutional neural network model and the first convolutional neural network model are convolutional neural network models of different network architectures.

Optionally, the first training unit includes:

a first extracting module configured to extract, from the plurality of the training videos, an original image corresponding to each of the training videos;

a first setting module configured to set the original images corresponding to the plurality of training videos extracted by the first extracting module as a training set of the first convolutional neural network model;

a first adjusting module configured to optimize and adjust parameters of the first convolutional neural network model according to a mapping relationship between an original image and a classification label corresponding to each of the training videos; and a first determining module configured to determine, when the first convolutional neural network model accurately outputs a classification label corresponding to each of the training videos, the first convolutional neural network model as the space-domain convolutional neural network model.

Optionally, the second training unit includes:

a second extracting module configured to extract, from the plurality of the training videos, an optical flow image corresponding to each of the training videos;

a second setting module configured to set the optical flow images corresponding to the plurality of training videos extracted by the second extracting module as a training set of the second convolutional neural network model;

a second adjusting module configured to optimize and adjust parameters of the second convolutional neural network model according to a mapping relationship between the optical flow image and the classification label corresponding to each of the training videos; and a second determining module configured to determine, when the second convolutional neural network model accurately outputs a classification label corresponding to each of the training videos, the second convolutional neural network model as the time-domain convolutional neural network model.

Optionally, the merging unit includes:

a calculating module configured to configured to calculate a weighted sum of the space-domain classification result and the time-domain classification result to obtain a classification result corresponding to the to-be-classified video, according to a first weight value corresponding to the space-domain classification result and a second weight value corresponding to the time-domain classification result.

Optionally, the space-domain classification result includes a space-domain score corresponding to each preset classification category, and the time-domain classification result includes a time-domain score corresponding to each of the preset classification categories; and the calculating module includes:

a calculating sub-module configured to calculate a weighted sum of a space-domain score and a time-domain score corresponding to each preset classification category according to the first weight value and the second weight value to obtain a total score corresponding to each preset classification category; and a determining sub-module configured to determine a preset classification category corresponding to the highest total score of the plurality of total scores which is calculated by the calculating sub-module, as the classification result corresponding to the to-be-classified video.

Optionally, the first convolutional neural network model is a ResNeXt network model, and the second convolutional neural network model is an Inception-v3 network model.

With the above technical solution, the technical solution provided by the present invention has at least the following advantages.

The present disclosure provides a method and a device for video classification. Compared with the related art in which the space-domain convolutional neural network model and the time-domain convolutional neural network model with the same network architecture are used to perform motion recognition on the original image and the optical flow image corresponding to the to-be-classified video, in the present disclosure, after the original image and the optical flow image corresponding to the to-be-classified video are extracted from the to-be-classified video, the original image corresponding to the to-be-classified video is input to a pre-trained space-domain convolutional neural network model selected according to the characteristics of the original image to obtain a space-domain classification result corresponding to the to-be-classified video, and the optical flow image corresponding to the to-be-classified video is input into a pre-trained time-domain convolutional neural network model selected according to the characteristics of the optical flow image to obtain a time-domain classification result corresponding to the to-be-classified video. Finally, the space-domain classification result and the time-domain classification result corresponding to the to-be-classified video are merged to obtain a classification result corresponding to the to-be-classified video. Because motion recognition is performed on the original image and the optical flow image corresponding to the to-be-classified video with the space-domain convolutional neural network model and the time-domain convolutional neural network model of different network architectures according to the respective characteristics of the original image and the optical flow image, the accuracy of motion recognition of objects in the classified video can be improved and in turn, the accuracy of classifying the to-be-classified video is improved. In addition, since a large number of training videos are acquired from different motion recognition data sets and/or gesture recognition data sets, and the original images corresponding to the large number of training videos and the optical flow images corresponding to the large number of training videos are respectively used as a training set to train the first convolutional neural network model and the second convolutional neural network model, the space-domain convolutional neural network model and the time-domain convolutional neural network model obtained by the training has good generalization performance.

The above description is only an overview of the technical solutions of the present disclosure, and the above-described and other objects, features, and advantages of the present disclosure can be more clearly understood. Specific embodiments of the present disclosure are set forth below.

BRIEF DESCRIPTION OF THE DRAWINGS

Various other advantages and benefits will become apparent to those of ordinary skill in the art from detailed description of the preferred embodiment below. The drawings are only for illustrating the preferred embodiments and are not to be construed as limiting the present disclosure. Throughout the drawings, the same reference numerals are used to refer to the same parts. In the drawings.

DETAILED DESCRIPTION

Exemplary embodiments of the present disclosure will be described in more detail below with reference to the accompanying drawings. Although the present disclosure has been shown and described with reference to exemplary embodiments, it should be understood that the present disclosure may be embodied in various forms and should not be limited by the embodiments set forth herein. Rather, these embodiments are provided so that the present disclosure may be more fully understood and the scope of the present disclosure can be fully conveyed to those skilled in the art.

Figure 1:
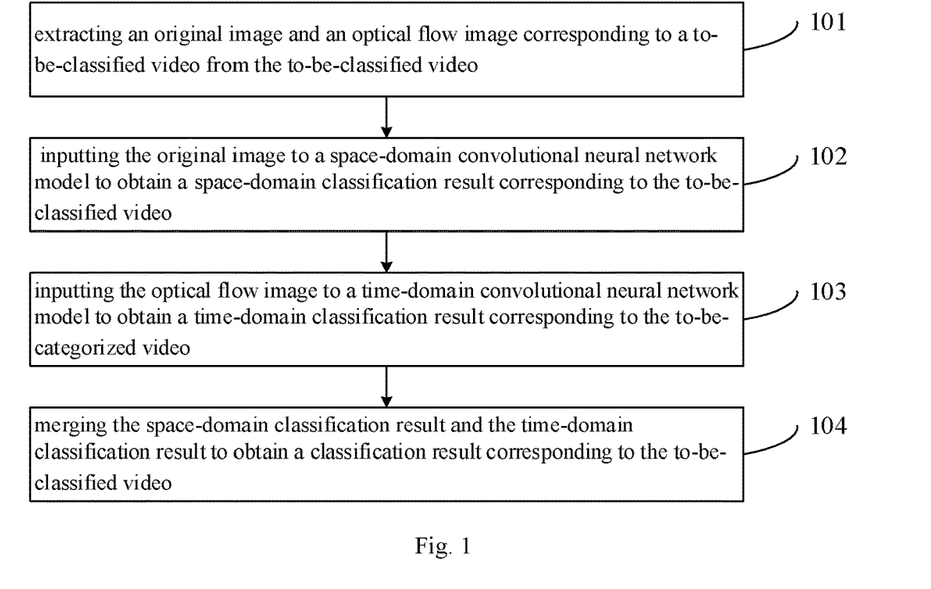
FIG. 1 is a flowchart of a method for video classification according to an embodiment of the present disclosure.

An embodiment of the present disclosure provides a method for video classification. As shown in FIG. 1, the method includes the following steps.

In 101, an original image and an optical flow image corresponding to a to-be-classified video are extracted from the to-be-classified video.

The original image corresponding to the to-be-classified video may be, but not limited to, an RGB image.

In the embodiment of the present disclosure, a video file is composed of a space element and a time element, where the space element refers to a single-frame image (i.e., an original image) in the video file that includes information about the scene and the object described in the video file, and the time element refers to a moving image (i.e., an optical flow image) between adjacent frames in a video file that contains motion information of the photographer of the video file and the object in the video file. Therefore, to facilitate classification of the to-be-classified video based on space-domain convolutional neural network model and time-domain convolutional neural network model in subsequent steps, the original image and the optical flow image corresponding to the to-be-classified video are extracted from the to-be-classified video.

It is to be noted that, in the actual application process, to extract the original image and the optical flow image corresponding to the to-be-classified video from the to-be-classified video, it is possible to extract each single-frame image in the to-be-classified video from the to-be-classified video, and take each extracted single-frame image as the original image corresponding to the to-be-classified video; and obtain an optical flow image corresponding to the to-be-classified video according to each single-frame image. Alternatively, it is possible to extract a part of single-frame images of the to-be-classified video from the to-be-classified video, and take the part of extracted single-frame images as the original image corresponding to the to-be-classified video; and obtain an optical flow image corresponding to the to-be-classified video according to the part of single-frame images. This is not specifically limited in this embodiment of the present disclosure.

In 102, the original image is input to a space-domain convolutional neural network model to obtain a space-domain classification result corresponding to the to-be-classified video.

The space-domain convolutional neural network model is a pre-trained convolutional neural network model selected according to the characteristics of the original image.

It should be noted that, since the texture and color of the original image are rich, the texture and color of the optical image are relatively simple, and when using the space-domain convolutional neural network model and the time-domain convolutional neural network model with the same network architecture perform motion recognition on the original image and the optical flow image corresponding to the video file, after the recognition accuracy of the motion recognition of the original image by each convolutional layer in the space-domain convolutional neural network model and the recognition accuracy of the motion recognition of the optical flow image by each convolutional layer in the time-domain convolutional neural network model, it can be found that the time-domain convolutional neural network model can obtain higher recognition accuracy by performing motion recognition on the optical flow image merely at a relatively lower convolutional layer, while the space-domain convolutional neural network model can obtain higher recognition accuracy by performing motion recognition on the original image at a relatively deep convolutional layer. In addition, it can be found that, at the convolutional layer of the same number of layers, the time-domain convolutional neural network model performs the motion recognition on the optical flow images more accurately than the space-domain convolutional neural network model performs the motion recognition on the original images. Therefore, the original image and the optical flow image each have different characteristics, and it is easier to extract features and perform motion recognition on the optical flow image than on the original image. Thereby, using the space-domain convolutional neural network model and the time-domain convolutional neural network model with the same network architecture to perform motion recognition on the original image and the optical flow image corresponding to the video file will affect the accuracy of motion recognition of objects in the video file to a certain extent, and so according to the different characteristics of the original image and the optical flow image, the space-domain convolutional neural network model and the time-domain convolutional neural network model with different network architectures are used to perform motion recognition on the original image and the optical flow image corresponding to the to-be-classified video.

In the embodiment of the present disclosure, after the original image corresponding to the to-be-classified video is extracted from the to-be-classified video, the original image corresponding to the to-be-classified video has to be input to a pre-trained space-domain convolutional neural network model selected according to the characteristics of the original image, to obtain a space-domain classification result corresponding to the to-be-classified video. That is, after the original image corresponding to the to-be-classified video is input to the space-domain convolutional neural network model, motion recognition is performed on the original image corresponding to the to-be-classified video with the space-domain convolutional neural network model. After completing the recognition, the space-domain convolutional neural network model can output a space-domain classification result corresponding to the to-be-classified video.

In 103, the optical flow image is input into a time-domain convolutional neural network model to obtain a time-domain classification result corresponding to the to-be-classified video.

The time-domain convolutional neural network model is a pre-trained convolutional neural network model selected according to the characteristics of the optical flow image. Since the space-domain convolutional neural network model is selected according to the characteristics of the original image, the time-domain convolutional neural network model is selected according to the characteristics of the optical flow image, and the original image and the optical flow image have different characteristics, the time-domain convolutional neural network model and the space-domain convolutional neural network model are convolutional neural network models of different network architectures.

In the embodiment of the present disclosure, after the optical flow image corresponding to the to-be-classified video is extracted from the to-be-classified video, the optical flow image corresponding to the to-be-classified video has to be input to the pre-trained time-domain convolutional neural network model selected according to the characteristics of the optical flow image to obtain a time-domain classification result corresponding to the to-be-classified video. That is, after the optical flow image corresponding to the to-be-classified video is input to the time-domain convolutional neural network model, motion recognition is performed on the optical flow image corresponding to the to-be-classified video with the time-domain convolutional neural network model. After completing the recognition, the time-domain convolutional neural network model can output a time-domain classification result corresponding to the to-be-classified video.

In 104, the space-domain classification result and the time-domain classification result are merged to obtain a classification result corresponding to the to-be-classified video.

In the embodiment of the present disclosure, after the space-domain classification result and the time-domain classification result corresponding to the to-be-classified video are acquired respectively, the space-domain classification result and the time-domain classification result are merged to obtain a classification result corresponding to the to-be-classified video.

The embodiment of the present disclosure provides a video classification method and, compared with the related art in which the space-domain convolutional neural network model and the time-domain convolutional neural network model with the same network architecture are used to perform motion recognition on the original image and the optical flow image corresponding to the to-be-classified video, in the embodiment of the present disclosure, after the original image and the optical flow image corresponding to the to-be-classified video are extracted from the to-be-classified video, the original image corresponding to the to-be-classified video is input to a pre-trained space-domain convolutional neural network model selected according to the characteristics of the original image, to obtain a space-domain classification result corresponding to the to-be-classified video, and the optical flow image corresponding to the to-be-classified video is input into a pre-trained time-domain convolutional neural network model selected according to the characteristics of the optical flow image, to obtain a time-domain classification result corresponding to the to-be-classified video. Finally, the space-domain classification result and the time-domain classification result corresponding to the to-be-classified video are merged to obtain a classification result corresponding to the to-be-classified video. Because motion recognition is performed on the original image and the optical flow image corresponding to the to-be-classified video with the space-domain convolutional neural network model and the time-domain convolutional neural network model of different network architectures according to the respective characteristics of the original image and the optical flow image, it can improve the accuracy of motion recognition of objects in the classified video and in turn, improve the accuracy of classifying the to-be-classified video.

Figure 2:
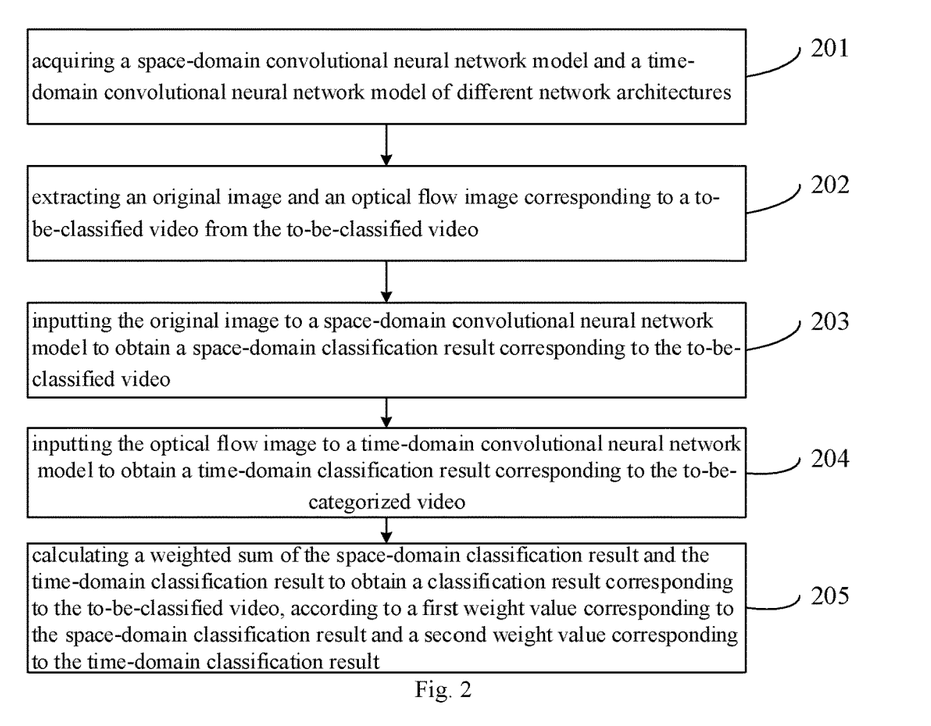
FIG. 2 is a flowchart of another method for video classification according to an embodiment of the present disclosure.

In order to explain in more detail, an embodiment of the present disclosure provides another method for video classification, more particularly, a detailed method for obtaining a space-domain convolutional neural network model and a time-domain convolutional neural network model of different network architectures, and merging the space-domain classification result and the time-domain classification result to obtain a classification result corresponding to the to-be-classified video. Specifically, as shown in FIG. 2, the method includes the following steps.

In 201, a space-domain convolutional neural network model and a time-domain convolutional neural network model of different network architectures are acquired.

In the embodiment of the present disclosure, in order to perform motion recognition on the original image and the optical flow image corresponding to the to-be-classified video with a space-domain convolutional neural network model and a time-domain convolutional neural network model of different network architectures according to the respective characteristics of the original image and the optical flow image, after the original image and the optical flow image corresponding to the to-be-classified video from the to-be-classified video are extracted, it is necessary to select a suitable convolutional neural network model according to the characteristics of the original image in advance, train the convolutional neural network model, so as to obtain the spatial-domain convolutional neural network model suitable for performing motion recognition on the original image; and it is necessary to select a suitable convolutional neural network model according to the characteristics of the optical flow image in advance, train the convolutional neural network model, so as to obtain the time-domain convolutional neural network model suitable for performing motion recognition on the optical flow image. In the following, it will be described how to obtain a space-domain convolutional neural network model and a time-domain convolutional neural network model of different network architectures.

(1) A plurality of training videos and a classification label corresponding to each training video are acquired from a motion recognition data set and/or a gesture recognition data set.

The motion recognition data set can be, but not limited to, a UCF101 data set, an HMDB51 data set, and the like, and the gesture recognition data set can be, but not limited to, a 20BN-JESTER data set or the like.

In the embodiment of the present disclosure, in order to train the convolutional neural network model selected according to the characteristics of the original image and the convolutional neural network model selected according to the characteristics of the optical flow image, it is first necessary to acquire a plurality of training videos and a classification label corresponding to each training video from a motion recognition data set and/or a gesture recognition data set.

(2) A first convolutional neural network model is trained according to the plurality of training videos and the classification label corresponding to each training video, to obtain a space-domain convolutional neural network model.

The first convolutional neural network model is a convolutional neural network model selected according to characteristics of the original image, wherein the first convolutional neural network model is specifically a ResNeXt network model.

In the embodiment of the present disclosure, after a plurality of training videos and a classification label corresponding to each training video are acquired from the motion recognition data set and/or the gesture recognition data set, the first convolutional neural network model is trained according to the plurality of training videos and the classification label corresponding to each training video to obtain a space-domain convolutional neural network model suitable for motion recognition of the original image. Specifically, in this step, when the first convolutional neural network model is trained according to the plurality of training videos and the classification label corresponding to each training video, an original image corresponding to each training video can be first extracted from the plurality of training videos. Then, the original images corresponding to the plurality of training videos are taken as the training set of the first convolutional neural network model to train the first convolutional neural network model. Since it is already known a mapping relationship between the original image corresponding to each training video and the classification label, that is, after the original image corresponding to a training video is input into the first convolutional neural network model, it is known which classification label will be output by the first convolutional neural network model, the process of training the first convolutional neural network model with the original images corresponding to the plurality of training videos as a training set, is a process of continuously optimizing and adjusting the parameters of the first convolutional neural network model according to the mapping relationship between the original image corresponding to each training video and the classification label. After the parameters of the first convolutional neural network model are continuously optimized and adjusted, when the original images corresponding to the plurality of training videos are input to the first convolutional neural network model, and the first convolutional neural network model can accurately output the classification label corresponding to each training video, it can be determined that adjustment of the parameters of the first convolutional neural network model has been completed. At this time, the first convolutional neural network model that completed training can be determined as a space-domain convolutional neural network model.

It should be noted that, since the first convolutional neural network model is a convolutional neural network model selected according to the characteristics of the original image, the space-domain convolutional neural network model obtained by training the first convolutional neural network model is the trained convolutional neural network model selected according to the characteristics of the original image, and the space-domain convolutional neural network model is suitable for perform motion recognition on the original image. In addition, since a large number of training videos are acquired from different motion recognition data sets and/or gesture recognition data sets, and the original images corresponding to the large number of training videos are used as a training set to train the first convolutional neural network model, the space-domain convolutional neural network model obtained by the training has good generalization performance.

(3) A second convolutional neural network model is trained according to the plurality of training videos and the classification label corresponding to each training video, to obtain a time-domain convolutional neural network model.

The second convolutional neural network model is a convolutional neural network model selected according to characteristics of the optical flow image. Since the first convolutional neural network model is selected according to characteristics of the original image, the second convolutional neural network model is selected according to characteristics of the optical flow image, and the original image and the optical flow image have different characteristics, the second convolutional neural network model and the first convolutional neural network model are convolutional neural network models of different network architectures, where the second convolutional neural network model is specifically a Inception-v3 network model.

In the embodiment of the present disclosure, after a plurality of training videos and a classification label corresponding to each training video are acquired from the motion recognition data set and/or the gesture recognition data set, the second convolutional neural network model is trained according to the plurality of training videos and the classification label corresponding to each training video to obtain a time-domain convolutional neural network model suitable for motion recognition of the optical flow image. Specifically, in this step, when the second convolutional neural network model is trained according to the plurality of training videos and the classification label corresponding to each training video, an optical flow image corresponding to each training video can first be extracted from the plurality of training videos. Then, the optical flow images corresponding to the plurality of training videos are taken as the training set of the second convolutional neural network model to train the second convolutional neural network model. Since it is already known a mapping relationship between the optical flow image corresponding to each training video and the classification label, that is, after the optical flow image corresponding to a training video is input into the second convolutional neural network model, it is known which classification label will be output by the second convolutional neural network model, the process of training the second convolutional neural network model with the optical flow images corresponding to the plurality of training videos as a training set, is a process of continuously optimizing and adjusting the parameters of the second convolutional neural network model according to the mapping relationship between the optical flow image corresponding to each training video and the classification label. After the parameters of the second convolutional neural network model are continuously optimized and adjusted, when the optical flow images corresponding to the plurality of training videos are input to the second convolutional neural network model, and the second convolutional neural network model can accurately output the classification label corresponding to each training video, it can be determined that adjustment of the parameters of the second convolutional neural network model has been completed. At this time, the second convolutional neural network model completed training can be determined as a time-domain convolutional neural network model.

It should be noted that, since the second convolutional neural network model is a convolutional neural network model selected according to the characteristics of the optical flow image, the time-domain convolutional neural network model obtained by training the second convolutional neural network model is the trained convolutional neural network model selected according to the characteristics of the optical flow image, and the time-domain convolutional neural network model is suitable for perform motion recognition on the optical flow image. In addition, since a large number of training videos are acquired from different motion recognition data sets and/or gesture recognition data sets, and the optical flow images corresponding to the large number of training videos are used as a training set to train the second convolutional neural network model, the time-domain convolutional neural network model obtained by the training has good generalization performance.

In 202, an original image and an optical flow image corresponding to a to-be-classified video are extracted from the to-be-classified video.

For the step 202, extracting the original image and the optical flow image corresponding to the to-be-classified video from the to-be-classified video, reference can be made to the description of the corresponding part in FIG. 1, details of which will not be repeated herein in the embodiment.

In 203, the original image is input to a space-domain convolutional neural network model to obtain a space-domain classification result corresponding to the to-be-classified video.

For the step 203, inputting the original image to a space-domain convolutional neural network model to obtain a space-domain classification result corresponding to the to-be-classified video, reference can be made to the description of the corresponding part in FIG. 1, details of which will not be repeated herein in the embodiment.

In 204, the optical flow image is input into a time-domain convolutional neural network model to obtain a time-domain classification result corresponding to the to-be-classified video.

For the step 204, inputting the optical flow image into a time-domain convolutional neural network model to obtain a time-domain classification result corresponding to the to-be-classified video, reference can be made to the description of the corresponding part in FIG. 1, details of which will not be repeated herein in the embodiment.

In 205, a weighted sum of the space-domain classification result and the time-domain classification result is calculated to obtain a classification result corresponding to the to-be-classified video, according to a first weight value corresponding to the space-domain classification result and a second weight value corresponding to the time-domain classification result.

In the embodiment of the present disclosure, after the space-domain classification result and the time-domain classification result corresponding to the to-be-classified video are acquired separately, the first weight value corresponding to the space-domain classification result and the second weight value corresponding to the time-domain classification result can be obtained. The weighted sum of the space-domain classification result and the time-domain classification result are calculated to realize the merging of the space-domain classification result and the time-domain classification result corresponding to the classified video, and the classification result corresponding to the to-be-classified video can be obtained. The following is detailed description of how to calculate the weighted sum of the space-domain classification result and the time-domain classification result to obtain a classification result corresponding to the to-be-classified video, according to a first weight value corresponding to the space-domain classification result and a second weight value corresponding to the time-domain classification result.

(1) A weighted sum of a space-domain score and a time-domain score corresponding to each preset classification category is calculated according to the first weight value and the second weight value to obtain a total score corresponding to each preset classification category.

The ratio between the first weight value corresponding to the space-domain classification result and the second weight value corresponding to the time-domain classification result can be, but is not limited to, 1.5:1, 2:1, and the like. The space-domain classification result includes a space-domain score corresponding to each preset classification category, and the time-domain classification result includes a space-domain score corresponding to each preset classification category.

In the embodiment of the present disclosure, after the space-domain classification result and the time-domain classification result corresponding to the to-be-classified video are acquired separately, a weighted sum of a space-domain score and a time-domain score corresponding to each preset classification category can be calculated according to the first weight value corresponding to the space-domain classification result and the second weight value corresponding to the time-domain classification result (that is, first, the space-domain score corresponding to each preset classification category is multiplied by the first weight value, the time-domain score corresponding to each preset classification category is multiplied by the second weight value, and then, the products are summed to obtain a total score corresponding to each preset classification category.

(2) The preset classification category corresponding to the highest total score of the plurality of total scores is determined as the classification result corresponding to the to-be-classified video.

In the embodiment of the present disclosure, after the total score corresponding to each preset classification category is obtained, the preset classification category corresponding to the highest total score of the plurality of total scores can be determined as the classification result corresponding to the to-be-classified video.

For the embodiment of the present disclosure, the specific application scenario can be as follows, but is not limited thereto.

After an original image and an optical flow image corresponding to a to-be-classified video A are extracted from the to-be-classified video A, the original image corresponding to the to-be-classified video A is input to the pre-trained space-domain convolutional neural network model selected according to the characteristics of the original image, to obtain a space-domain classification result corresponding to the to-be-classified video A: a preset classification category a: 0.2, a preset classification category b: 0.5, a preset classification category c: 0.1, a preset classification category d: 0.1, and a preset classification category e: 0.1. The optical flow image corresponding to the to-be-classified video A is input to the pre-trained time-domain convolutional neural network model selected according to the characteristics of the optical flow image to obtain a time-domain classification result corresponding to the to-be-classified video A: the preset classification category a: 0.1, the preset classification category b: 0.3, the preset classification category c: 0.2, the preset classification category d: 0.1, and the preset classification category e: 0.3. Since the ratio between the first weight value corresponding to the space-domain classification result and the second weight value corresponding to the time-domain classification result is 1.5:1, weighted sum of a space-domain score and a time-domain score corresponding to each preset classification category is calculated according to the first weight value and the second weight value to obtain a total score corresponding to each preset classification category: the preset classification category a: 0.2*1.5+0.1*1=0.4, the preset classification category b: 0.5*1.5+0.3*1=1.05, the preset classification category c: 0.1*1.5+0.2*1=0.35, the preset classification category d: 0.1*1.5+0.1*1=0.25, and the preset classification category e: 0.1*1.5+1*0.3=0.45. Since the total score corresponding to the preset classification category b is the highest, the preset classification category b can be determined as the classification result corresponding to the to-be-classified video.

It should be noted that the number of preset classification categories mentioned and the space-domain score and the time-domain score corresponding to each preset classification category in the foregoing examples are only for convenience of illustration, and in actual application, the number of preset classification categories can be any value and the space-domain score and the time-domain score corresponding to each preset classification category can be any value, which is not specifically limited in the embodiment of the present disclosure.

In order to achieve the above object, according to another aspect of the present disclosure, an embodiment of the present disclosure further provides an electronic device, including: a memory, a processor, and a program stored on the memory and executable on the processor, when the processor executes the program, the method for video classification described above is implemented.

In order to achieve the above object, according to another aspect of the present disclosure, an embodiment of the present disclosure further provides a non-transitory computer readable storage medium having stored thereon a computer program, the program is executed to implement the method for video classification described above.

Figure 3:
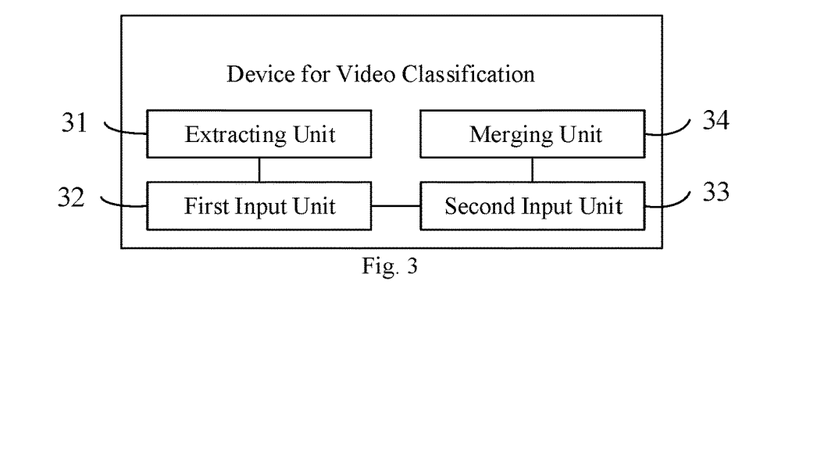
FIG. 3 is a structural block diagram of a device for video classification according to an embodiment of the present disclosure.

Further, as an implementation of the method shown in FIG. 1 and FIG. 2, an embodiment of the present disclosure provides a device for video classification. The device embodiment corresponds to the foregoing method embodiment. For ease of reading, the device embodiment does not describe the details in the foregoing method embodiments one by one, but it should be clear that the device in this embodiment can implement all the contents of the foregoing method. The device is applied to improve the accuracy of classifying video files. As shown in FIG. 3, the device includes:

- an extracting unit 31 configured to extract an original image and an optical flow image corresponding to a to-be-classified video from the to-be-classified video;
- a first input unit 32 configured to input the original image extracted by the extracting unit 31 to a space-domain convolutional neural network model to obtain a space-domain classification result corresponding to the to-be-classified video;
- a second input unit 33 configured to input the optical flow image extracted by the extracting unit 31 to a time-domain convolutional neural network model to obtain a time-domain classification result corresponding to the to-be-categorized video, wherein the time-domain convolutional neural network model and the space-domain convolutional neural network model are convolutional neural network models of different network architectures; and
- a merging unit 34 configured to merge the space-domain classification result and the time-domain classification result to obtain a classification result corresponding to the to-be-classified video.

Figure 4:
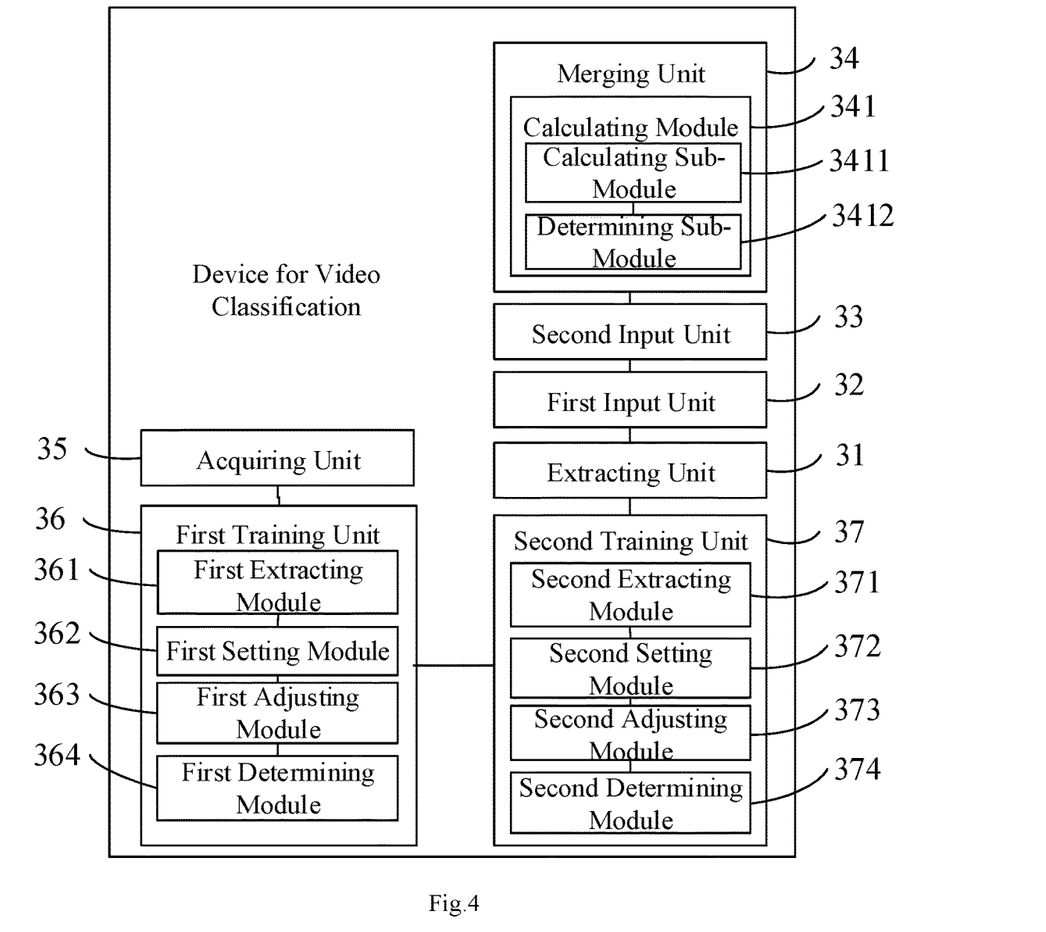
FIG. 4 is a structural block diagram of another device for video classification according to an embodiment of the present disclosure.

Further, as shown in FIG. 4, the device further includes:
- an acquiring unit 35 configured to acquire a plurality of training videos and a classification label corresponding to each training video from a motion recognition data set and/or a gesture recognition data set before the extracting unit 31 extracts an original image and an optical flow image corresponding to the to-be-classified video from the to-be-classified video;
- a first training unit 36 configured to train a first convolutional neural network model according to the plurality of training videos and the classification label corresponding to each training video acquired by the acquiring unit 35, to obtain a space-domain convolutional neural network model; and
- a second training unit 37 configured to train a second convolutional neural network model according to the plurality of training videos and the classification label corresponding to each training video acquired by the acquiring unit 35, to obtain a time-domain convolutional neural network model, wherein the second convolutional neural network model and the first convolutional neural network model are convolutional neural network models of different network architectures.

Further, as shown in FIG. 4, the first training unit 36 includes:
- a first extracting module 361 configured to extract, from the plurality of the training videos, an original image corresponding to each of the training videos;
- a first setting module 362 configured to set the original images corresponding to the plurality of training videos extracted by the first extracting module 361 as a training set of the first convolutional neural network model;
- a first adjusting module 363 configured to optimize and adjust parameters of the first convolutional neural network model according to a mapping relationship between an original image and a classification label corresponding to each of the training videos; and
- a first determining module 364 configured to determine, when the first convolutional neural network model accurately outputs a classification label corresponding to each of the training videos, the first convolutional neural network model as the space-domain convolutional neural network model.

Further, as shown in FIG. 4, the second training unit 37 includes:
- a second extracting module 371 configured to extract, from the plurality of the training videos, an optical flow image corresponding to each of the training videos;
- a second setting module 372 configured to set the optical flow images corresponding to the plurality of training videos extracted by the second extracting module 371 as a training set of the second convolutional neural network model;
- a second adjusting module 373 configured to optimize and adjust parameters of the second convolutional neural network model according to a mapping relationship between the optical flow image and the classification label corresponding to each of the training videos; and
- a second determining module 374 configured to determine, when the second convolutional neural network model accurately outputs a classification label corresponding to each of the training videos, the second convolutional neural network model as the time-domain convolutional neural network model.

Further, as shown in FIG. 4, the merging unit 34 includes:
- a calculating module 341 configured to calculate a weighted sum of the space-domain classification result and the time-domain classification result to obtain a classification result corresponding to the to-be-classified video, according to a first weight value corresponding to the space-domain classification result and a second weight value corresponding to the time-domain classification result.

Further, as shown in FIG. 4, the space-domain classification result includes a space-domain score corresponding to each preset classification category, and the time-domain classification result includes a time-domain score corresponding to each of the preset classification categories; and the calculating module 341 includes:
- a calculating sub-module 3411 configured to calculate a weighted sum of a space-domain score and a time-domain score corresponding to each preset classification category according to the first weight value and the second weight value to obtain a total score corresponding to each preset classification category; and
- a determining sub-module 3412 configured to determine a preset classification category corresponding to the highest total score of the plurality of total scores which is calculated by the calculating sub-module 3411, as the classification result corresponding to the to-be-classified video.

Further, as shown in FIG. 4, the first convolutional neural network model is a ResNeXt network model, and the second convolutional neural network model is an Inception-v3 network model.

Accordingly, the method and the device for video classification are provided by the embodiments of the present disclosure. Compared with the related art in which the space-domain convolutional neural network model and the time-domain convolutional neural network model with the same network architecture are used to perform motion recognition on the original image and the optical flow image corresponding to the to-be-classified video, in the embodiment of the present disclosure, after the original image and the optical flow image corresponding to the to-be-classified video are extracted from the to-be-classified video, the original image corresponding to the to-be-classified video is input to a pre-trained space-domain convolutional neural network model selected according to the characteristics of the original image, to obtain a space-domain classification result corresponding to the to-be-classified video, and the optical flow image corresponding to the to-be-classified video is input into a pre-trained time-domain convolutional neural network model selected according to the characteristics of the optical flow image, to obtain a time-domain classification result corresponding to the to-be-classified video. Finally, the space-domain classification result and the time-domain classification result corresponding to the to-be-classified video are merged to obtain a classification result corresponding to the to-be-classified video. Because motion recognition is performed on the original image and the optical flow image corresponding to the to-be-classified video with the space-domain convolutional neural network model and the time-domain convolutional neural network model of different network architectures according to the respective characteristics of the original image and the optical flow image, it can improve the accuracy of motion recognition of objects in the classified video, and in turn, improve the accuracy of classifying the to-be-classified video. In addition, since a large number of training videos are acquired from different motion recognition data sets and/or gesture recognition data sets, and the original images corresponding to the large number of training videos and the optical flow images corresponding to the large number of training videos are respectively used as a training set to train the first convolutional neural network model and the second convolutional neural network model, the space-domain convolutional neural network model and the time-domain convolutional neural network model obtained by the training has good generalization performance.

The device for video classification includes a processor (e.g., hardware processor) and a memory, and the extracting unit, the first input unit, the second input unit, the merging unit, the acquiring unit, the first training unit, and the second training unit, which are stored in a memory as a program unit, and the program unit stored in the memory is executed by the processor to achieve the corresponding function.

The processor contains a kernel, and the kernel invokes the corresponding program unit from the memory. The kernel can be provided in one or more memory devices and can improve the accuracy of classifying video files by adjusting kernel parameters.

The memory can include a non-persistent memory, a random access memory (RAM), and/or a non-volatile memory in a computer readable medium, such as a read only memory (ROM) or a flash memory (flash RAM), and the memory includes at least one memory chip.

An embodiment of the present disclosure provides an electronic device, including: a memory, a processor, and a program stored on the memory and executable on the processor. When the program is executed by the processor, the method for video classification described above is implemented.

An embodiment of the present disclosure provides a computer readable storage medium, on which a computer program is stored. When the program is executed, the method for video classification described above is implemented.

An embodiment of the present disclosure provides a device, including a processor, a memory, and a program stored on the memory and executable on the processor. The processor implements the following steps when executing the program:

extracting an original image and an optical flow image corresponding to a to-be-classified video from the to-be-classified video;

inputting the original image to a space-domain convolutional neural network model to obtain a space-domain classification result corresponding to the to-be-classified video;

inputting the optical flow image to a time-domain convolutional neural network model to obtain a time-domain classification result corresponding to the to-be-categorized video, wherein the time-domain convolutional neural network model and the space-domain convolutional neural network model are convolutional neural network models of different network architectures; and merging the space-domain classification result and the time-domain classification result to obtain a classification result corresponding to the to-be-classified video.

Further, before extracting an original image and an optical flow image corresponding to the to-be-classified video from the to-be-classified video, the method further includes:

acquiring a plurality of training videos and a classification label corresponding to each training video from a motion recognition data set and/or a gesture recognition data set;

training a first convolutional neural network model according to the plurality of training videos and the classification label corresponding to each training video to obtain a space-domain convolutional neural network model; and training a second convolutional neural network model according to the plurality of training videos and the classification label corresponding to each training video to obtain a time-domain convolutional neural network model, wherein the second convolutional neural network model and the first convolutional neural network model are convolutional neural network models of different network architectures.

Further, training a first convolutional neural network model according to the plurality of training videos and the classification label corresponding to each training video to obtain a space-domain convolutional neural network model includes:

extracting, from the plurality of the training videos, an original image corresponding to each of the training videos;

setting the original images corresponding to the plurality of training videos as a training set of the first convolutional neural network model; and optimizing and adjusting parameters of the first convolutional neural network model according to a mapping relationship between an original image and a classification label corresponding to each of the training videos; and determining, when the first convolutional neural network model accurately outputs a classification label corresponding to each of the training videos, the first convolutional neural network model as the space-domain convolutional neural network model.

Further, training a second convolutional neural network model according to the plurality of training videos and the classification label corresponding to each training video to obtain a time-domain convolutional neural network model includes:

extracting, from the plurality of the training videos, an optical flow image corresponding to each of the training videos;

setting the optical flow images corresponding to the plurality of training videos as a training set of the second convolutional neural network model; and optimizing and adjusting parameters of the second convolutional neural network model according to a mapping relationship between the optical flow image and the classification label corresponding to each of the training videos; and determining, when the second convolutional neural network model accurately outputs a classification label corresponding to each of the training videos, the second convolutional neural network model as the time-domain convolutional neural network model.

Further, merging the space-domain classification result and the time-domain classification result to obtain a classification result corresponding to the to-be-classified video includes:

calculating a weighted sum of the space-domain classification result and the time-domain classification result to obtain a classification result corresponding to the to-be-classified video, according to a first weight value corresponding to the space-domain classification result and a second weight value corresponding to the time-domain classification result.

Further, the space-domain classification result includes a space-domain score corresponding to each preset classification category, and the time-domain classification result includes a time-domain score corresponding to each of the preset classification categories; and calculating a weighted sum of the space-domain classification result and the time-domain classification result to obtain a classification result corresponding to the to-be-classified video, according to a first weight value corresponding to the space-domain classification result and a second weight value corresponding to the time-domain classification result includes:

calculating a weighted sum of a space-domain score and a time-domain score corresponding to each preset classification category according to the first weight value and the second weight value to obtain a total score corresponding to each preset classification category; and determining a preset classification category corresponding to the highest total score of the plurality of total scores as the classification result corresponding to the to-be-classified video.

Further, the first convolutional neural network model is a ResNeXt network model, and the second convolutional neural network model is an Inception-v3 network model.

The devices in this document can be a server, a PC, and the like.

The present application further provides a computer program product, when executed on a data processing device, adapted to execute the program codes initialized with method steps of: extracting an original image and an optical flow image corresponding to a to-be-classified video from the to-be-classified video; inputting the original image to a space-domain convolutional neural network model to obtain a space-domain classification result corresponding to the to-be-classified video; inputting the optical flow image to a time-domain convolutional neural network model to obtain a time-domain classification result corresponding to the to-be-categorized video, wherein the time-domain convolutional neural network model and the space-domain convolutional neural network model are convolutional neural network models of different network architectures; and merging the space-domain classification result and the time-domain classification result to obtain a classification result corresponding to the to-be-classified video.

Those skilled in the art will appreciate that embodiments of the present application can be provided as a method, a system, or a computer program product. Thus, the present application can take the form of an entirely hardware embodiment, an entirely software embodiment, or an embodiment in combination of software and hardware. Moreover, the application can take the form of a computer program product embodied on one or more computer-usable storage media (including, but not limited to, disk storage, a CD-ROM, optical storage, etc.) including computer usable program codes.

The present application is described with reference to flowcharts and/or block diagrams of methods, devices (systems), and computer program products according to embodiments of the present application. It will be understood that each step of the flowchart and/or each block of the block diagrams or combination thereof can be implemented by computer program instructions. These computer program instructions can be provided to a processor of a general purpose computer, a special purpose computer, an embedded processor, or other programmable data processing device to produce a machine, such that instructions that are executed by a processor of a computer or other programmable data processing device can produce a device for implementing the functions specified in one or more steps of the flowchart and/or one or more blocks of the block diagrams.

The computer program instructions can also be stored in a computer readable memory that can direct a computer or other programmable data processing device to operate in a particular manner, such that the instructions stored in the computer readable memory produce an article of manufacture including the instruction device. The instruction device implements the functions specified in one or more steps of the flowchart and/or one or more blocks of the block diagrams.

These computer program instructions can also be loaded onto a computer or other programmable data processing device such that a series of operational steps are performed on a computer or other programmable device to produce computer-implemented processing for execution on a computer or other programmable device. The instructions provide steps for implementing the functions specified in one or more of the flow or in a block or blocks of a flow diagram.

In a typical configuration, a computing device includes one or more processors (CPUs), an input/output interface, a network interface, and a memory.

The memory can include a non-persistent memory, a random access memory (RAM), and/or a non-volatile memory in a computer readable medium, such as a read only memory (ROM) or a flash memory. The memory is an example of a computer readable medium.

Computer readable media includes persistent and non-persistent, removable and non-removable media, which can implement information storage by any method or technology. The information can be computer readable instructions, data structures, modules of programs, or other data. Examples of computer storage media include, but are not limited to, a phase change memory (PRAM), a static random access memory (SRAM), a dynamic random access memory (DRAM), other types such as a random access memory (RAM), a read only memory (ROM), an electrically erasable programmable read only memory (EEPROM), a flash memory or other memory technology, a compact disk read only memory (CD-ROM), a digital versatile disk (DVD) or other optical storage, a magnetic tape cartridge, magnetic tape storage, or other magnetic storage devices or any other non-transportable media can be used to store information that can be accessed by a computing device. As defined herein, computer readable media does not include transient media, such as modulated data signals and carrier waves.

It is also to be understood that the terms "including" or "comprising" or any other variations are intended to encompass a non-exclusive inclusion, such that a process, a method, an article, other elements not explicitly listed, or elements that are inherent to such a process, method, commodity, or equipment. An element defined by the phrase "comprising a . . . " does not exclude the presence of additional identical elements in a process, method, article, or device that comprises the element, without further limitation.

Those skilled in the art will appreciate that embodiments of the present application can be provided as a method, a system, or a computer program product. Thus, the present application can take the form of an entirely hardware embodiment, an entirely software embodiment or an embodiment in combination of software and hardware. Moreover, the application can take the form of a computer program product embodied on one or more computer-usable storage media (including, but not limited to, disk storage, a CD-ROM, optical storage, etc.) including computer usable program codes.

The above is only an embodiment of the present application and is not intended to limit the application. Various changes and modifications can be made to the present application by those skilled in the art. Any modifications, equivalents, improvements, and so on made within the spirit and scope of the present application are intended to be included within the scope of the appended claims.

What is claimed is:

1. A method for video classification, comprising:
    acquiring a plurality of training videos and a classification label corresponding to each of the training videos from at least one of a motion recognition data set and a gesture recognition data set;
    training a first convolutional neural network model according to the plurality of training videos and the classification label corresponding to each of the training videos to obtain a space-domain convolutional neural network model;
    training a second convolutional neural network model according to the plurality of training videos and the classification label corresponding to each of the training videos to obtain a time-domain convolutional neural network model, wherein the second convolutional neural network model and the first convolutional neural network model are convolutional neural network models of different network architectures;
    extracting an original image and an optical flow image corresponding to a to-be-classified video from the to-be-classified video;
    inputting the original image to the space-domain convolutional neural network model to obtain a space-domain classification result corresponding to the to-be-classified video;
    inputting the optical flow image to the time-domain convolutional neural network model to obtain a time-domain classification result corresponding to the to-be-classified video, wherein the time-domain convolutional neural network model and the space-domain convolutional neural network model are convolutional neural network models of different network architectures; and
    merging the space-domain classification result and the time-domain classification result to obtain a classification result corresponding to the to-be-classified video.

2. The method for video classification according to claim 1, wherein training the first convolutional neural network model according to the plurality of training videos and the classification label corresponding to each of the training videos to obtain the space-domain convolutional neural network model comprises:
    extracting, from the plurality of training videos, an original image corresponding to each of the training videos;
    setting the original images corresponding to the plurality of training videos as a training set of the first convolutional neural network model; and optimizing and adjusting parameters of the first convolutional neural network model according to a mapping relationship between an original image and the classification label corresponding to each of the training videos; and
    determining, when the first convolutional neural network model accurately outputs the classification label corresponding to each of the training videos, the first convolutional neural network model as the space-domain convolutional neural network model.

3. The method for video classification according to claim 2, wherein the first convolutional neural network model is a ResNeXt network model, and the second convolutional neural network model is an Inception-v3 network model.

4. The method for video classification according to claim 1, wherein training the second convolutional neural network model according to the plurality of training videos and the classification label corresponding to each of the training videos to obtain the time-domain convolutional neural network model comprises:
    extracting, from the plurality of training videos, the optical flow image corresponding to each of the training videos to generate a plurality of optical flow images;
    setting the optical flow images corresponding to the plurality of training videos as a training set of the second convolutional neural network model;
    optimizing and adjusting parameters of the second convolutional neural network model according to a mapping relationship between the optical flow image and the classification label corresponding to each of the training videos; and
    determining, when the second convolutional neural network model accurately outputs the classification label corresponding to each of the training videos, the second convolutional neural network model as the time-domain convolutional neural network model.

5. The method for video classification according to claim 4, wherein the first convolutional neural network model is a ResNeXt network model, and the second convolutional neural network model is an Inception-v3 network model.

6. The method for video classification according to claim 1, wherein merging the space-domain classification result and the time-domain classification result to obtain the classification result corresponding to the to-be-classified video comprises:
calculating a weighted sum of the space-domain classification result and the time-domain classification result to obtain the classification result corresponding to the to-be-classified video, according to a first weight value corresponding to the space-domain classification result and a second weight value corresponding to the time-domain classification result.

7. The method for video classification according to claim 6, wherein the space-domain classification result comprises a space-domain score corresponding to each of a preset classification category, and the time-domain classification result comprises a time-domain score corresponding to each of the preset classification categories; and calculating the weighted sum of the space-domain classification result and the time-domain classification result to obtain the classification result corresponding to the to-be-classified video, according to the first weight value corresponding to the space-domain classification result and the second weight value corresponding to the time-domain classification result comprises:
calculating the weighted sum of the space-domain score and the time-domain score corresponding to each preset classification category according to the first weight value and the second weight value to obtain a total score corresponding to each preset classification category; and
determining the preset classification category corresponding to a highest total score of a plurality of total scores as the classification result corresponding to the to-be-classified video.

8. The method for video classification according to claim 1, wherein the first convolutional neural network model is a ResNeXt network model, and the second convolutional neural network model is an Inception-v3 network model.

9. An electronic device, comprising: a memory, at least one hardware processor, and a program stored on the memory and executable on the at least one hardware processor that, when executed, directs the electronic device to perform the method for video classification according to claim 1.

10. A non-transitory computer-readable storage medium having stored thereon a computer program, wherein, when the computer program is executed by at least one hardware processor, the method for video classification according to claim 1 is implemented.

11. A device for video classification, comprising:
an acquiring unit configured to acquire a plurality of training videos and a classification label corresponding to each of the training videos from at least one of a motion recognition data set and a gesture recognition data set before extraction of an original image and an optical flow image corresponding to a to-be-classified video from the to-be-classified video;
a first training unit configured to train a first convolutional neural network model according to the plurality of training videos and the classification label corresponding to each of the training videos acquired by the acquiring unit to obtain a space-domain convolutional neural network model;
a second training unit configured to train a second convolutional neural network model according to the plurality of training videos and the classification label corresponding to each of the training videos acquired by the acquiring unit to obtain a time-domain convolutional neural network model, wherein the second convolutional neural network model and the first convolutional neural network model are convolutional neural network models of different network architectures;
an extracting unit configured to extract the original image and the optical flow image corresponding to the to-be-classified video from the to-be-classified video;
a first input unit configured to input the original image extracted by the extracting unit to the space-domain convolutional neural network model to obtain a space-domain classification result corresponding to the to-be-classified video;
a second input unit configured to input the optical flow image extracted by the extracting unit to the time-domain convolutional neural network model to obtain a time-domain classification result corresponding to the to-be-classified video, wherein the time-domain convolutional neural network model and the space-domain convolutional neural network model are convolutional neural network models of different network architectures; and
a merging unit configured to merge the space-domain classification result and the time-domain classification result to obtain a classification result corresponding to the to-be-classified video.

12. The device for video classification according to claim 11, wherein the first training unit comprises:
a first extracting module configured to extract, from the plurality of the training videos, an original image corresponding to each of the training videos;
a first setting module configured to set the original images corresponding to the plurality of training videos extracted by the first extracting module as a training set of the first convolutional neural network model;
a first adjusting module configured to optimize and adjust parameters of the first convolutional neural network model according to a mapping relationship between the original image and the classification label corresponding to each of the training videos; and
a first determining module configured to determine, when the first convolutional neural network model accurately outputs the classification label corresponding to each of the training videos, the first convolutional neural network model as the space-domain convolutional neural network model.

13. The device for video classification according to claim 12, wherein the first convolutional neural network model is a ResNeXt network model, and the second convolutional neural network model is an Inception-v3 network model.

14. The device for video classification according to claim 11, wherein the second training unit comprises:
a second extracting module configured to extract, from the plurality of the training videos, the optical flow image corresponding to each of the training videos to generate a plurality of optical flow images;
a second setting module configured to set the optical flow images corresponding to the plurality of training videos extracted by the second extracting module as a training set of the second convolutional neural network model;

a second adjusting module configured to optimize and adjust parameters of the second convolutional neural network model according to a mapping relationship between the optical flow image and the classification label corresponding to each of the training videos; and a second determining module configured to determine, when the second convolutional neural network model accurately outputs the classification label corresponding to each of the training videos, the second convolutional neural network model as the time-domain convolutional neural network model.

15. The device for video classification according to claim 14, wherein the first convolutional neural network model is a ResNeXt network model, and the second convolutional neural network model is an Inception-v3 network model.

16. The device for video classification according to claim 11, wherein the merging unit comprises:

a calculating module configured to calculate a weighted sum of the space-domain classification result and the time-domain classification result to obtain the classification result corresponding to the to-be-classified video, according to a first weight value corresponding to the space-domain classification result and a second weight value corresponding to the time-domain classification result.

17. The device for video classification according to claim 16, wherein the space-domain classification result comprises a space-domain score corresponding to each of a preset classification category, and the time-domain classification result comprises a time-domain score corresponding to each of the preset classification categories; and the calculating module comprises:

a calculating sub-module configured to calculate a weighted sum of a space-domain score and a time-domain score corresponding to each preset classification category according to the first weight value and the second weight value to obtain a total score corresponding to each preset classification category; and a determining sub-module configured to determine the preset classification category corresponding to a highest total score of a plurality of total scores which is calculated by the calculating sub-module, as the classification result corresponding to the to-be-classified video.

18. The device for video classification according to claim 11, wherein the first convolutional neural network model is a ResNeXt network model, and the second convolutional neural network model is an Inception-v3 network model.

19. A system for video classification, comprising:

at least one computing device comprising at least one hardware processor; and program instructions stored in memory and executable by the at least one hardware processor that, when executed, direct the at least one computing device to:

acquire a plurality of training videos and a classification label corresponding to each of the training videos from at least one of a motion recognition data set and a gesture recognition data set;

train a first convolutional neural network model according to the plurality of training videos and the classification label corresponding to each of the training videos to obtain a space-domain convolutional neural network model;

train a second convolutional neural network model according to the plurality of training videos and the classification label corresponding to each of the training videos to obtain a time-domain convolutional neural network model, wherein the second convolutional neural network model and the first convolutional neural network model are convolutional neural network models of different network architectures;

extract an original image and an optical flow image corresponding to a to-be-classified video from the to-be-classified video;

input the original image to the space-domain convolutional neural network model to obtain a space-domain classification result corresponding to the to-be-classified video;

input the optical flow image to the time-domain convolutional neural network model to obtain a time-domain classification result corresponding to the to-be-classified video, wherein the time-domain convolutional neural network model and the space-domain convolutional neural network model are convolutional neural network models of different network architectures; and merge the space-domain classification result and the time-domain classification result to obtain a classification result corresponding to the to-be-classified video.

* * * * *